J. J. Magee,
Unloading Vessels.

N°  25,973.    Patented Nov. 1, 1859.

Witnesses.    Inventor.

UNITED STATES PATENT OFFICE.

J. J. MAGEE, OF FERNANDINA, FLORIDA.

MACHINE FOR UNLOADING VESSELS.

Specification of Letters Patent No. 25,973, dated November 1, 1859.

*To all whom it may concern:*

Be it known that I, J. J. MAGEE, of Fernandina, in the county of Nassau and State of Florida, have invented a new and Improved Machine for Unloading Vessels, &c.; and I do hereby declare that the following is a full, clear, and exact description of the same, reference being had to the accompanying drawings, forming a part of this specification, in which—

Figure 1:
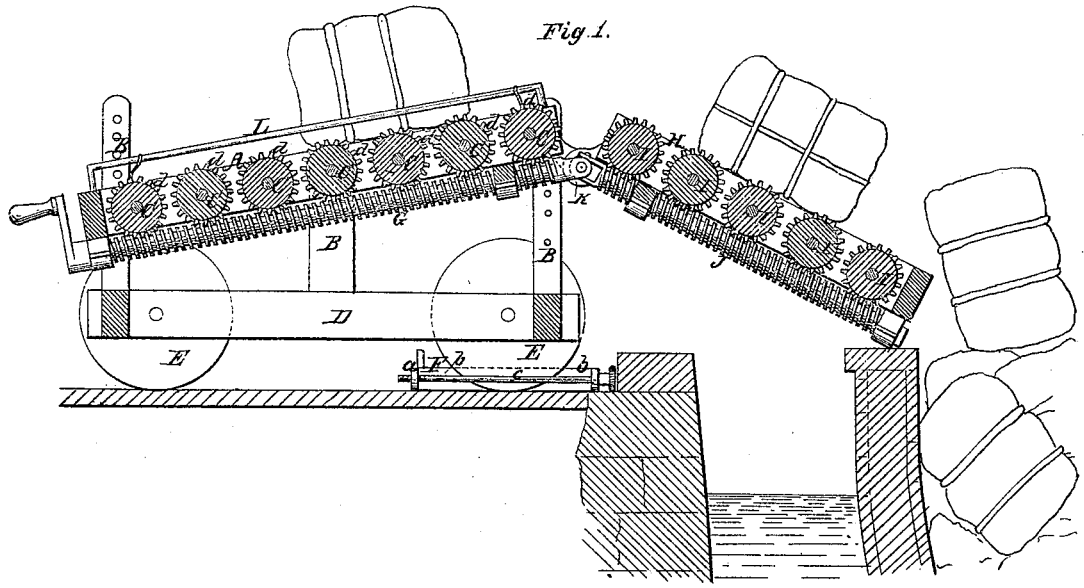
Figure 2:
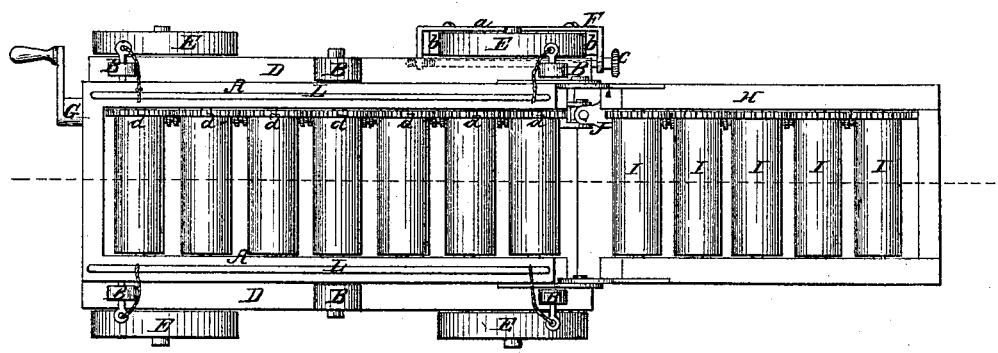

Figure 1 represents a longitudinal vertical section of my invention. Fig. 2 is a plan or top view of ditto.

Similar letters in both views refer to corresponding parts.

Under the present method of loading and unloading vessels much precious time is lost. Each bale, package or box has to be tied separately to the hoisting rope, raised up, swung over the sides of the vessel, and lowered down on the car when the vessel is to be unloaded, or swung over the hatchway, and lowered to the required place in the vessel. And in many cases the time allowed for loading and unloading a vessel is so short that it becomes necessary to make the men work day and night in order to get the vessel ready for sea on the appointed day. This labor is greatly facilitated and simplified by my invention, which consists in arranging in two hinged frames a series of rollers to which a rotary motion is imparted by an endless screw that gears into worm wheels, which are firmly secured on the axles of said rollers, and these screws are connected by a universal joint, so that when one part of the frame is turned down into the vessel and the other part toward the car that is waiting on the dock to receive the goods, by imparting motion to one of the screws, the several rollers are caused to rotate, and that the bale or package placed on one end of the frame is brought to the other end by the motion of said rollers, and without further attendance.

To enable those skilled in the art to make and use my invention I will proceed to describe it.

A represents a frame constructed of square timbers and sufficiently long to reach from the side of the vessel down to a convenient spot on the dock. This frame is adjustable on standards, B, so that it can be brought to any desired inclination, as clearly shown in Fig. 1, and it contains a series of rollers, C, which turn freely in the sides of the frame, A.

The standards, B, are supported by a separate frame, D, that rests on wheels, E, so that the whole machine can be readily brought from place to place, and in order to arrest the wheels in the desired spot I have constructed a blocking, F, which can be readily adjusted to the wheels, and it consists of a metal frame, *a*, in which two shoes, *b*, are fitted, which can be forced up against the wheel, when the frame is in its place. A pin or screw, *c*, serves to retain the whole in the desired spot.

A rotary motion is imparted to the rollers, C, by means of an endless screw, G, that gears into worm wheels, *d*, which are secured to the axles or ends of the rollers, so that none of the rollers is allowed to move until the screw is rotated and that all the rollers receive a positive motion with the same velocity.

Hinged to the frame, A, is another similar frame, H, containing a series of rollers, I, to which motion is imparted by a screw, J, and this screw is united to the screw, G, by a universal joint, K, as clearly represented in the drawing. The pivots which unite the two frames, A and H, are exactly in line with the pivot on which the universal joint turns, so that when the frame, H, is turned down into the port hole of a vessel, or when it is brought to a certain inclination, the free motion of the screws, G and J, is not obstructed.

When the machine has arrived on the desired spot the back end of the frame, A, is elevated, and the frame, H, is turned down through the port hole of the vessel and it may be made long enough so as to reach down to the lower deck. The front end of the frame, A, extends down to the deck and over a car or wagon. The screws are now rotated and as one bale or package after the other is placed on the rollers, I, in the frame, H, the motion of said rollers causes the packages to travel from the frame, H, to the frame, A, and down to the car.

Railings, L, may be arranged on the sides of the frames to prevent the packages rolling off sidewise.

It is obvious that the goods may be brought into the vessel in the same manner by turning the screws in an opposite direction, and my machine may also be used for moving heavy articles from place to place in warehouses, or for builders, etc.

Having thus fully described my invention, what I claim as new and desire to secure by Letters Patent, is—

The arrangement of the frames, A and H, with rollers, C, and I, and with screws, G and J, or their equivalents, substantially as and for the purpose specified.

J. J. MAGEE.

Witnesses:
 M. M. LIVINGSTON,
 C. M. HUGHES.